(12) United States Patent
Kondo et al.

(10) Patent No.: US 11,507,790 B2
(45) Date of Patent: Nov. 22, 2022

(54) PRINTING METHOD IN WHICH EACH OF RASTER LINES CONFIGURING LINE IMAGE IS FORMED BY PLURALITY OF PASS OPERATIONS, PRINTING DEVICE THAT FORMS EACH OF RASTER LINES CONFIGURING LINE IMAGE BY PLURALITY OF PASS OPERATIONS, AND PRINTING SYSTEM

(71) Applicant: SEIKO EPSON CORPORATION, Tokyo (JP)

(72) Inventors: Takamitsu Kondo, Nagano (JP); Jun Hoshii, Nagano (JP); Kimitaka Kamijo, Nagano (JP); Tomoyuki Kondo, Nagano (JP); Eishin Yoshikawa, Nagano (JP); Takashi Tamai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/350,016

(22) Filed: Jun. 17, 2021

(65) Prior Publication Data

US 2021/0397913 A1 Dec. 23, 2021

(30) Foreign Application Priority Data

Jun. 19, 2020 (JP) .............................. JP2020-105853

(51) Int. Cl.
*G06K 15/00* (2006.01)
*G06K 15/02* (2006.01)
(Continued)

(52) U.S. Cl.
CPC ....... *G06K 15/1877* (2013.01); *G06K 15/105* (2013.01); *G06K 15/16* (2013.01);
(Continued)

(58) Field of Classification Search
None
See application file for complete search history.

(56) References Cited

U.S. PATENT DOCUMENTS 10,713,546 B2 * 7/2020 Tanase ................... B41J 2/2103
2011/0242174 A1 10/2011 Kakutani
(Continued)

FOREIGN PATENT DOCUMENTS

JP 2005-305694 A 11/2005

*Primary Examiner* — Barbara D Reinier
(74) *Attorney, Agent, or Firm* — Global IP Counselors, LLP

(57) ABSTRACT

Provided is a printing method for performing printing using a serial printer. In printing of a print image including a line image, the printing method includes a raster line forming step of forming each of raster lines configuring the image, by a plurality of pass operations. In the formation of each of the raster lines, when printing of a region corresponding to edge pixels of the line image by a first pass operation, which is one of the plurality of pass operations, is first printing, and printing of the region corresponding to the edge pixels by a second pass operation that is different from the first pass operation, of the plurality of pass operations, is second printing, a brightness of the printing by the second printing is higher than a brightness of the printing by the first printing.

10 Claims, 14 Drawing Sheets

(51) Int. Cl.
  *G06K 15/10* (2006.01)
  *G06K 15/16* (2006.01)
(52) U.S. Cl.
  CPC ..... *G06K 15/1836* (2013.01); *G06K 15/1872* (2013.01); *G06K 15/1881* (2013.01)

(56) References Cited

U.S. PATENT DOCUMENTS

| | | | |
|---|---|---|---|
| 2011/0285871 A1* | 11/2011 | Sakai | G06T 5/008 348/E5.037 |
| 2012/0314234 A1* | 12/2012 | Miyazaki | B41J 2/2132 358/1.9 |
| 2014/0218427 A1 | 8/2014 | Nishioka | |
| 2018/0288278 A1 | 10/2018 | Yamada | |

\* cited by examiner

| 0 | 0 | 0 | 0 | 0 | 0 | 0 | 0 | 0 | 0 | 0 | 0 | 0 | 0 |
|---|---|---|---|---|---|---|---|---|---|---|---|---|---|
| 0 | 0 | 0 | 0 | 0 | 0 | 0 | 0 | 0 | 0 | 0 | 0 | 0 | 0 |
| 0 | 0 | 0 | 0 | 0 | 0 | 0 | 15.9 | 47.8 | 63.8 | 47.8 | 15.9 | 0 | 0 |
| 0 | 0 | 0 | 0 | 0 | 0 | 0 | 47.8 | 143 | 191 | 143 | 47.8 | 0 | 0 |
| 0 | 0 | 0 | 0 | 0 | 0 | 0 | 63.8 | 191 | 255 | 191 | 63.8 | 0 | 0 |
| 0 | 0 | 0 | 0 | 0 | 0 | 0 | 63.8 | 191 | 255 | 191 | 63.8 | 0 | 0 |
| 0 | 0 | 15.9 | 47.8 | 63.8 | 63.8 | 63.8 | 112 | 207 | 255 | 191 | 63.8 | 0 | 0 |
| 0 | 0 | 47.8 | 143 | 191 | 191 | 191 | 207 | 239 | 255 | 191 | 63.8 | 0 | 0 |
| 0 | 0 | 63.8 | 191 | 255 | 255 | 255 | 255 | 255 | 255 | 191 | 63.8 | 0 | 0 |
| 0 | 0 | 63.8 | 191 | 255 | 239 | 207 | 191 | 191 | 191 | 143 | 47.8 | 0 | 0 |
| 0 | 0 | 63.8 | 191 | 255 | 207 | 112 | 63.8 | 63.8 | 63.8 | 47.8 | 15.9 | 0 | 0 |
| 0 | 0 | 63.8 | 191 | 255 | 191 | 63.8 | 0 | 0 | 0 | 0 | 0 | 0 | 0 |
| 0 | 0 | 63.8 | 191 | 255 | 191 | 63.8 | 0 | 0 | 0 | 0 | 0 | 0 | 0 |
| 0 | 0 | 47.8 | 143 | 191 | 143 | 47.8 | 0 | 0 | 0 | 0 | 0 | 0 | 0 |
| 0 | 0 | 15.9 | 47.8 | 63.8 | 47.8 | 15.9 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |

| 1/16 | 2/16 | 1/16 |
|---|---|---|
| 2/16 | 4/16 | 2/16 |
| 1/16 | 2/16 | 1/16 |

PRINTING METHOD IN WHICH EACH OF RASTER LINES CONFIGURING LINE IMAGE IS FORMED BY PLURALITY OF PASS OPERATIONS, PRINTING DEVICE THAT FORMS EACH OF RASTER LINES CONFIGURING LINE IMAGE BY PLURALITY OF PASS OPERATIONS, AND PRINTING SYSTEM

The present application is based on and claims priority from JP Application Serial Number 2020-105853, filed Jun. 19, 2020, the disclosure of which is hereby incorporated by reference herein in its entirety.

BACKGROUND

1. Technical Field

The present disclosure relates to a printing method, a printing device, and a printing system.

2. Related Art

As a printing device, an inkjet printer is known that includes a head that reciprocates in a main scanning direction, and discharges ink during both forward scanning and return scanning to perform bi-directional printing. In such a printer, in order to match landing positions of ink droplets discharged while moving in the forward direction and landing positions of ink droplets discharged while moving in the return direction, a timing of the ink discharge in the printing during the return scanning is adjusted with respect to the printing during the forward scanning.

In JP-A-2005-305694, a printing device is disclosed that creates a test pattern for matching the ink landing positions in the forward direction and the return direction in the main scanning direction, for each of a plurality of head units provided in the head. A correction value for a discharge timing can be determined from the test pattern, and the landing positions can be adjusted by referring to the correction value during the printing.

However, a degree of displacement of the landing positions of the ink droplets in the main scanning direction and a degree of variation in a transport accuracy of a printing medium in a sub scanning direction orthogonal to the main scanning direction, that is, in a transport direction of the printing medium may change depending on changes in a usage environment of the printing device, a change in mechanical accuracy over time, differences in a surface specification or a thickness of the printed medium to be conveyed, and the like. As a result, with the set correction value, there is a case in which sufficient adjustment is not performed or the adjustment has to be remade frequently, or a case in which the adjustment cannot be sufficiently made in a stable manner.

In particular, when a print image is a pattern image such as a geometric pattern configured by ultrafine lines, since banding unevenness is easily visible even with a slight displacement, there is a demand for further improvement.

SUMMARY

A printing method according to the present disclosure is a printing method for performing printing by a printing device including a transport unit configured to transport a printing medium in a transport direction, a head configured to discharge a liquid onto the transported printing medium, a scanning unit configured to move the head relative to the printing medium in a scanning direction intersecting the transport direction, and a control unit configured to control the transport unit, the head, and the scanning unit to perform the printing by repeating a pass operation of causing the head to perform scanning motion while discharging the liquid, and a transport operation by the transport unit. The printing method includes, in printing of a print image including a line image, a raster line forming step of forming each of raster lines configuring the image, using a plurality of the pass operations. In the formation of each of the raster lines, when printing of a region corresponding to edge pixels of the line image by a first pass operation, which is one of the plurality of pass operations, is first printing, and printing of the region corresponding to the edge pixels by a second pass operation that is different from the first pass operation, of the plurality of pass operations, is second printing, a brightness of the printing by the second printing is higher than a brightness of the printing by the first printing.

A printing device according to the present disclosure is a printing device including a transport unit configured to transport a printing medium in a transport direction, a head configured to discharge a liquid onto the transported printing medium, a scanning unit configured to move the head relative to the printing medium in a scanning direction intersecting the transport direction, and a control unit configured to control the transport unit, the head, and the scanning unit to perform the printing by repeating a pass operation of causing the head to perform scanning motion while discharging the liquid, and a transport operation by the transport unit. In printing of a print image including a line image, the control unit performs control to form each of raster lines configuring the line image, by a plurality of the pass operations. When, in the formation of each of the raster lines, printing of a region corresponding to edge pixels of the line image by a first pass operation, which is one of the plurality of pass operations, is first printing, and printing of the region corresponding to the edge pixels by a second pass operation that is different from the first pass operation, of the plurality of pass operations, is second printing, the control unit performs control to cause a brightness of the printing by the second printing to be higher than a brightness of the printing by the first printing.

A printing system according to the present disclosure is a printing system including an image processing unit configured to convert input input image data to print data, a transport unit configured to transport a printing medium in a transport direction, a head configured to discharge a liquid onto the transported printing medium, a scanning unit configured to move the head relative to the printing medium in a scanning direction intersecting the transport direction, and a control unit configured to control the transport unit, the head, and the scanning unit based on the print data, to perform the printing by repeating a pass operation of causing the head to perform scanning motion while discharging the liquid, and a transport operation by the transport unit. When forming each of raster lines configuring the line image, by a plurality of the pass operations, when printing of a region corresponding to edge pixels of the line image by a first pass operation, which is one of the plurality of pass operations, is first printing, and printing of the region corresponding to the edge pixels by a second pass operation that is different from the first pass operation, of the plurality of pass operations, is second printing, the image processing unit generates, from the input image data of a print image including a line image, the print data to cause a brightness of the printing by the second printing to be higher than a brightness of the printing by the first printing.

DESCRIPTION OF EXEMPLARY EMBODIMENTS

First Embodiment

Figure 1:
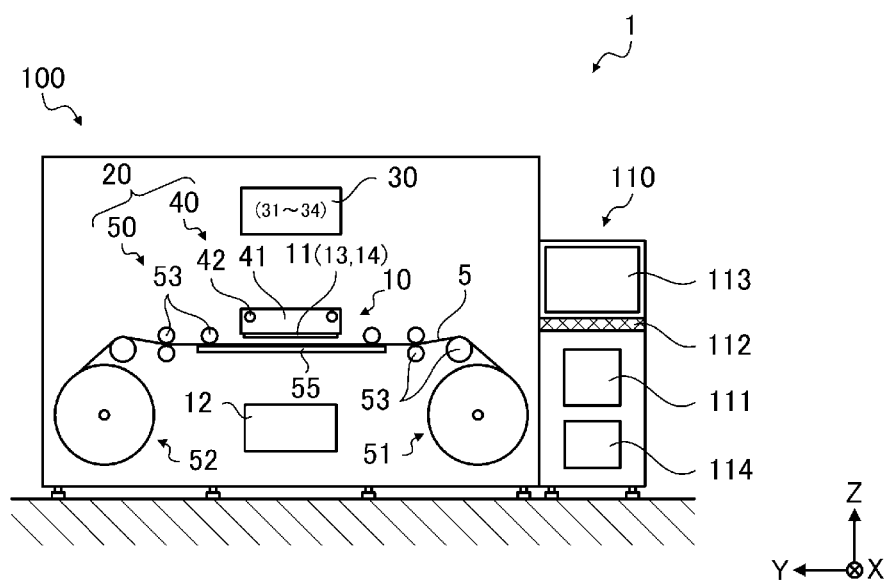
FIG. 1 is a front view illustrating a configuration of a printing system according to a first embodiment.
Figure 2:
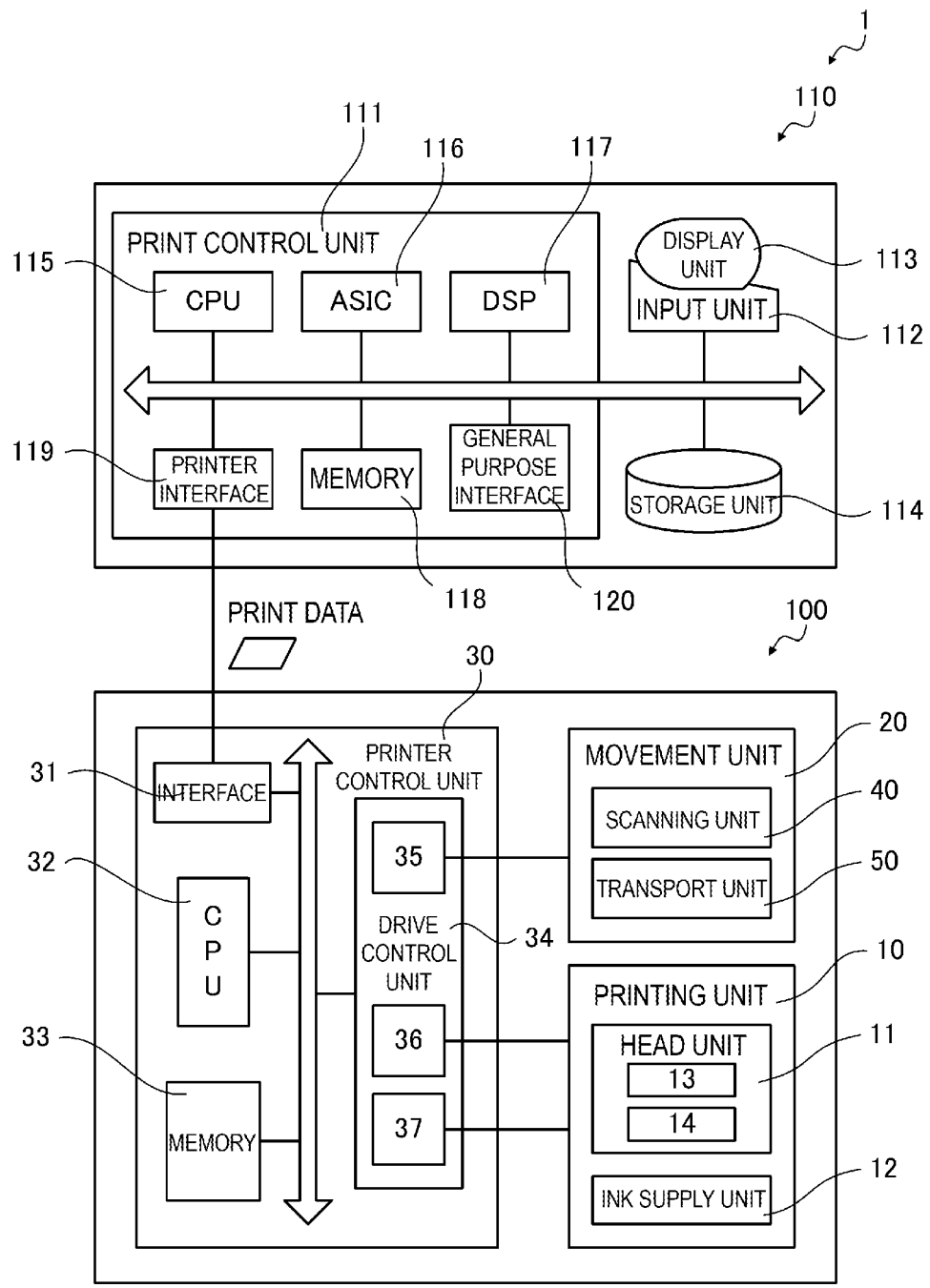
FIG. 2 is a block diagram illustrating the configuration of the printing system according to the first embodiment.

A configuration of a printing system 1 according to an embodiment will be described with reference to FIG. 1 and FIG. 2.

Note that, for coordinates noted in the drawings, a Z-axis direction is an up-down direction, a positive Z direction is an upward direction, an X-axis direction is a front-rear direction, a negative X direction is a frontward direction, a Y-axis direction is a left-right direction, a positive Y direction is a leftward direction, and an X-Y plane is a horizontal plane.

The printing system 1 includes a printer 100, and an image processing device 110 coupled to the printer 100. The image processing device 110 corresponds to an image processing unit of the embodiment.

The printer 100 is an inkjet printer that prints a desired image on a long printing medium 5 that is set in a state of being wound into a roll shape, based on print data received from the image processing device 110.

The printing medium 5 may be, for example, high quality paper, cast coated paper, art paper, coated paper, synthetic paper, or the like. Further, the printing medium 5 is not limited to this type of paper, and may be, for example, fabric, or a film formed of PET, PP, or the like. PET is an abbreviation for polyethylene terephthalate, and PP is an abbreviation for polypropylene.

The image processing device 110 includes a print control unit 111, an input unit 112, a display unit 113, a storage unit 114, and the like, and controls print jobs that cause the printer 100 to perform printing. Further, the image processing device 110 generates print data used to cause the printer 100 to print a desired image based on input image data. In a preferred example, the image processing device 110 is configured using a personal computer.

Software operated by the image processing device 110 includes general image processing application software that handles the input image data to be printed, and printer driver software that generates the print data for causing the printer 100 to perform the printing. In the following description, the image processing application software is simply referred to as an image processing application. Further, the printer driver software is simply referred to as a printer driver.

Here, the input image data is image data input for the printing, and is RGB digital image information also including text data, full-color image data, and the like.

The print control unit 111 includes a CPU 115, an ASIC 116, a DSP 117, a memory 118, a printer interface 119, a general purpose interface 120, and the like, and performs centralized management of the printing system 1 as a whole. CPU is an abbreviation for central processing unit, ASIC is an abbreviation for application specific integrated circuit, and DSP is an abbreviation for digital signal processor.

The input unit 112 is an information input device serving as a user interface. Specifically, the input unit 112 is, for example, a keyboard, a mouse pointer, and the like.

The display unit 113 is an information display device serving as a user interface, and displays information input from the input unit 112, images to be printed by the printer 100, information relating to the print job, and the like, under the control of the print control unit 111.

The storage unit 114 is a rewritable storage medium such as a hard disk drive or a memory card, and stores programs operated by the print control unit 111 as the software operated by the image processing device 110, the input image data to be printed, the information relating to the print job, and the like.

The memory 118 is a storage medium that secures a region for storing programs run by the CPU 115, a work region in which such programs run, and the like, and includes storage elements such as a RAM and an EEPROM. RAM is an abbreviation for random access memory, and EEPROM is an abbreviation for electrically erasable programmable read-only memory.

The general purpose interface 120 is an interface capable of coupling external electronic devices, such as a LAN interface, a USB interface, and the like. LAN is an abbreviation for local area network, and USB is an abbreviation for universal serial bus.

The printer 100 includes a printing unit 10, a movement unit 20, a printer control unit 30 serving as a control unit in the embodiment, and the like. The printer 100 that has received the print data from the image processing device 110 uses the printer control unit 30 to control the printing unit 10 and the movement unit 20 based on the print data, and thus prints an image on the printing medium 5.

The print data is image formation data obtained as a result of the image processing application and the printer driver provided in the image processing device 110 converting the input image data such that the input image data can be printed by the printer 100, and includes commands to control the printer 100.

The printing unit 10 includes a head unit 11, an ink supply unit 12, and the like.

The movement unit 20 includes a scanning unit 40, a transport unit 50, and the like.

The scanning unit 40 includes a carriage 41, guide shafts 42, a carriage motor, and the like. The carriage motor is not illustrated.

The transport unit 50 includes a supply unit 51, a housing unit 52, transport rollers 53, a platen 55, and the like.

The head unit 11 includes a head 13 provided with a plurality of nozzle rows in which a plurality of nozzles are arrayed for discharging printing ink as ink droplets, and a head control unit 14. The head unit 11 is mounted on the carriage 41, and reciprocates in the X-axis direction along with the carriage 41 that moves in the X-axis direction that is a scanning direction. The head 13 provided in the head unit 11 mounted on the carriage 41 discharges the ink droplets onto the printing medium 5 supported by the platen 55 while moving in the X-axis direction under the control of the printer control unit 30, and thus, raster lines formed of a plurality of dot rows along the X-axis direction are formed on the printing medium 5.

Note that in the following description, an operation to form the dots by discharging the ink from the head 13 while moving in the X-axis direction is referred to as a "pass operation", or alternatively, simply as a "pass." A single pass operation refers to the dot formation in accordance with the movement in the X-axis direction one time. By combining, in the Y-axis direction that is the transport direction intersecting the scanning direction, partial images printed by the dot formation in accordance with the movement in the X-axis direction, the desired image based on the input image data is printed.

The ink supply unit 12 includes an ink tank, an ink supply path that supplies ink from the ink tank to the head 13, and the like. The ink tank and the ink supply path are not illustrated.

As the inks, as inks of a CMYK color system, a four-color ink set formed by adding black to inks of the three colors of cyan, magenta, and yellow is used. Note that the ink set is not limited to this example. For example, an eight-color ink set formed by adding, to the four-color ink set, an ink set in which a concentration of each of the color materials is lightened, such as light cyan, light magenta, light yellow, and light black, may be used.

The ink supply paths to the ink tank and to the nozzle that discharges the same ink are provided independently for each of the inks.

A piezo method is employed as a method for discharging the ink droplets. The piezo method is a method for printing in which a pressure corresponding to a print information signal is applied to the ink stored in a pressure generating chamber provided in the head 13 by an actuator using a piezo element as a piezoelectric element, thus discharging the ink droplets from the nozzle communicated with the pressure generating chamber.

Note that the method for discharging ink droplets is not limited to this example, and another printing method may be used in which the ink is ejected in a droplet form to form dot groups on the printing medium.

The movement unit 20, namely, the scanning unit 40 and the transport unit 50, causes the printing medium 5 to relatively move with respect to the head 13 under the control of the printer control unit 30.

The guide shafts 42 extend in the X-axis direction and support the carriage 41 in a slidable state. Further, the carriage motor serves as a drive source when causing the carriage 41 to reciprocate along the guide shafts 42. In other words, under the control of the printer control unit 30, the scanning unit 40 causes the carriage 41, namely, the head 13, to scan in the X-axis direction along the guide shafts 42.

The supply unit 51 rotatably supports a reel on which the printing medium 5 is wound into a roll shape, and feeds the printing medium 5 onto a transport path. The housing unit 52 rotatably supports a reel onto which the printing medium 5 is taken up, and takes up the printing medium 5 on which the printing is complete, from the transport path.

The transport roller 53 includes a driving roller that causes the printing medium 5 to move in the transport direction on an upper surface of the platen 55, and a driven roller that rotates in accordance with the movement of the printing medium 5, and configures the transport path for transporting the printing medium 5 from the supply unit 51 to the housing unit 52, via a printing region of the printing unit 10. The printing region is a region in which the head 13 moves in the X-axis direction over the upper surface of the platen 55.

The printer control unit 30 includes an interface 31, a CPU 32, a memory 33, a drive control unit 34, and the like, and controls the printer 100.

The interface 31 is coupled to the printer interface 119 of the image processing device 110, and transmits and receives data between the image processing device 110 and the printer 100.

The CPU 32 is an arithmetic processing unit for overall control of the printer 100.

The memory 33 is a storage medium that secures a region for storing programs operated by the CPU 32, a work region in which such programs are operated, and the like, and includes storage elements such as a RAM and an EEPROM.

The CPU 32 controls the printing unit 10 and the movement unit 20, via the drive control unit 34, in accordance with the programs stored in the memory 33 and print data received from the image processing device 110.

The drive control unit 34 includes firmware that operates based on the control of the CPU 32, and controls driving of the head unit 11 and the ink supply unit 12 of the printing unit 10, and the scanning unit 40 and the transport unit 50 of the movement unit 20. The drive control unit 34 includes drive control circuits including a movement control signal generating circuit 35, a discharge control signal generating circuit 36, and a drive signal generating circuit 37, and a ROM, a flash memory, or the like incorporating the firmware that controls the drive control circuits. The ROM or the flash memory incorporating the firmware that controls the drive control circuits are not illustrated. Here, ROM is an abbreviation for read-only memory.

The movement control signal generating circuit 35 is a circuit that generates a signal for controlling the scanning unit 40 and the transport unit 50 of the movement unit 20, based on the print data, in accordance with a command from the CPU 32.

The discharge control signal generating circuit 36 is a circuit that generates a head control signal for selecting the nozzle for discharging the ink, selecting an amount of the ink to be discharged, controlling a discharge timing, and the like, based on the print data, in accordance with a command from the CPU 32.

The drive signal generating circuit 37 is a circuit that generates a drive signal for driving the pressure generating chamber provided in the head 13.

Figure 3:
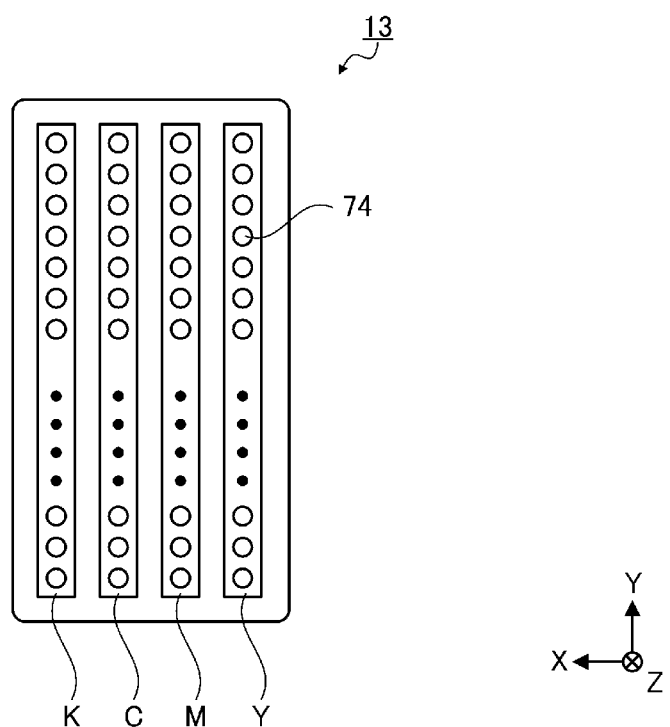
FIG. 3 is a schematic view illustrating an example of a nozzle arrangement when viewed from a lower surface of a head.

As illustrated in FIG. 3, the head 13 includes a black ink nozzle row K, a cyan ink nozzle row C, a magenta ink nozzle row M, and a yellow ink nozzle row Y formed by aligning a plurality of nozzles 74 that discharge the inks. The plurality of nozzles 74 of each of the nozzle rows are respectively disposed and aligned at a constant interval along the transport direction, that is, the Y-axis direction.

According to the configuration described above, the printer control unit 30 prints the desired image on the printing medium 5 by repeating an operation of discharging the ink droplets, with respect to the printing medium 5 supplied to the printing region by the transport rollers 53, from the head 13 while moving the carriage 41 supporting the head 13 along the guide shafts 42 in the X-axis direction, and a operation of moving the printing medium 5, using the transport rollers 53, in the positive Y direction that intersects the X-axis direction.

The printing on the printing medium 5 is started by transmitting the print data to the printer 100 from the image processing device 110. The print data is generated by the printer driver.

Figure 4:
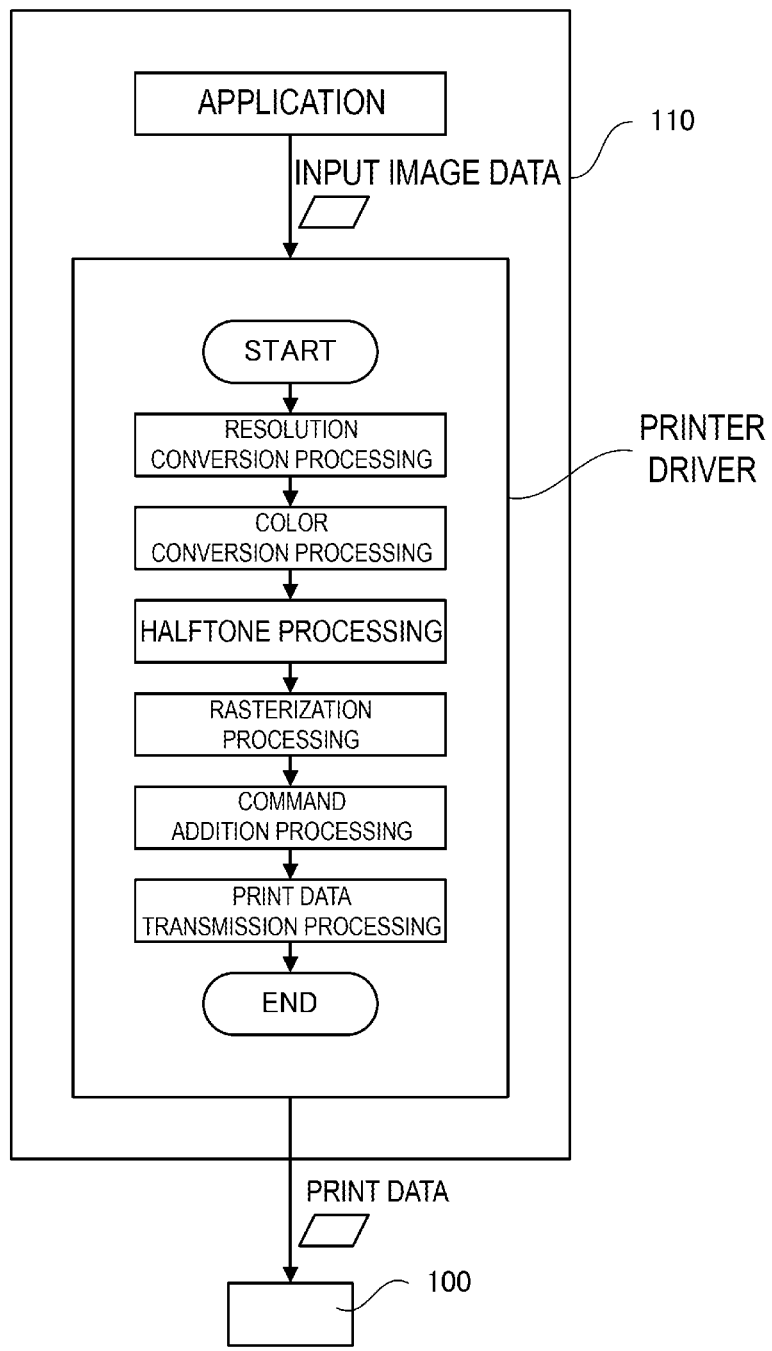
FIG. 4 is an explanatory diagram of basic functions of a printer driver.

A basic flow of print data generation processing will be described below with reference to FIG. 4.

The printer driver is activated by the image processing application, receives the input image data from the image processing application, converts the input image data into the print data in a format that can be interpreted by the printer 100, and outputs the print data to the printer 100. When converting the input image data from the image processing application into the print data, the printer driver performs resolution conversion processing, color conversion processing, halftone processing, rasterization processing, command addition processing, and the like.

The resolution conversion processing is processing that converts the input image data output from the image processing application to a resolution to be used when performing the printing on the printing medium 5. For example, when the resolution for the printing is specified as 720×720 dpi, the input image data of a vector format received from the image processing application is converted into bit map format image data having the resolution of 720×720 dpi. Each of pixel data of the image data after the resolution conversion processing includes pixels arranged in a matrix pattern. Each of the pixels has a gradation value, for example, in 256 gradations in a RGB color space. That is, the pixel data after the resolution conversion indicates the gradation value of the corresponding pixel.

Among the pixels arranged in the matrix pattern, the pixel data corresponding to one row of pixels aligned in a predetermined direction is referred to as raster data. Note that the predetermined direction in which the pixels corresponding to the raster data are aligned corresponds to the movement direction of the head 13 when printing the image, that is, to the X-axis direction. The movement direction of the head 13 is a relative movement direction in which the head 13 and the printing medium 5 move relative to each other.

The color conversion processing is processing that converts RGB data into data of a CMYK color system space. The CMYK colors are cyan, magenta, yellow, and black. The image data of the CMYK color system space is data corresponding to the colors of the inks of the printer 100. Thus, when the printer 100 uses the four types of ink of the CMYK color system, the printer driver generates the image data in a four-dimensional space of the CMYK color system, based on the RGB data.

This color conversion processing is performed based on a color conversion look-up table LUT in which the gradation values of the RGB data and gradation values of the CMYK color system data are associated with each other. Note that the pixel data after the color conversion processing is, for example, the CMYK color system data of 256 gradations represented by the CMYK color system space.

The halftone processing is processing that converts data of a large number of gradations, such as the 256 gradations, for example, into data of a number of gradations that can be formed by the printer 100. Through this halftone processing, the data indicating the 256 gradations is converted, for example, into 1-bit data indicating two gradations of dot or no dot, and 2-bit data indicating four gradations of no dot, small dot, medium dot, and large dot. Specifically, a dot generation ratio corresponding to the gradation value is determined from a dot generation ratio table in which the gradation values of 0 to 255 and the dot generation ratio are associated with each other. In the case of the four gradations, the dot generation ratio determined in accordance with the gradation value is, for example, a generation ratio of each of the no dot, small dot, medium dot, and large dot. In the obtained respective generation ratios, the image data is created such that the dots are dispersed and formed, using a dither method, an error diffusion method, or the like.

The rasterization processing is processing that rearranges the above-described 1-bit or 2-bit pixel data arranged in the matrix pattern, in accordance with a dot formation order at the time of printing. The rasterization processing includes pass allocation processing of allocating the image data configured by the pixel data after the halftone processing to each of passes in which the head 13 discharges the ink droplets while moving. Once the pass allocation is completed, actual nozzles that form the respective raster lines configuring the printing image are allocated.

The command addition processing is processing that adds command data corresponding to a printing method, to the rasterized data. The command data is, for example, transport data relating to a transport specification of the printing medium 5. The transport specification is, for example, a movement amount and speed of the printing medium 5 in the transport direction on the upper surface of the platen 55.

The above-described series of processing by the printer driver is performed by the ASIC 116 and the DSP 117 under the control of the CPU 115. In print data transmission processing, the print data generated by the above-described series of processing is transmitted to the printer 100 via the printer interface 119.

In the printing system 1 having the basic configuration described above, as illustrated in FIG. 5, for example, there is a case in which, when a print image G0 including a line image configured by three pixel columns is printed using the two pass operations of first printing a print image G1 while scanning in a positive X direction and subsequently printing a print image G2 while scanning in the negative X direction, a position of the print image G2 of the subsequent printing becomes displaced with respect to the print image G1 of the first printing. FIG. 6 illustrates the print image G0 when the print image G0 has been displaced by Δx in the scanning direction and by Δy in the transport direction.

When this direction of the displacement and degree of the displacement changes before and after the printing medium 5 has been transported with respect to the head 13, this may be visible as banding unevenness. In particular, when the print image is a pattern image such as a geometric pattern configured by ultrafine lines, the banding unevenness is easily visible even with a slight displacement.

Figure 5:
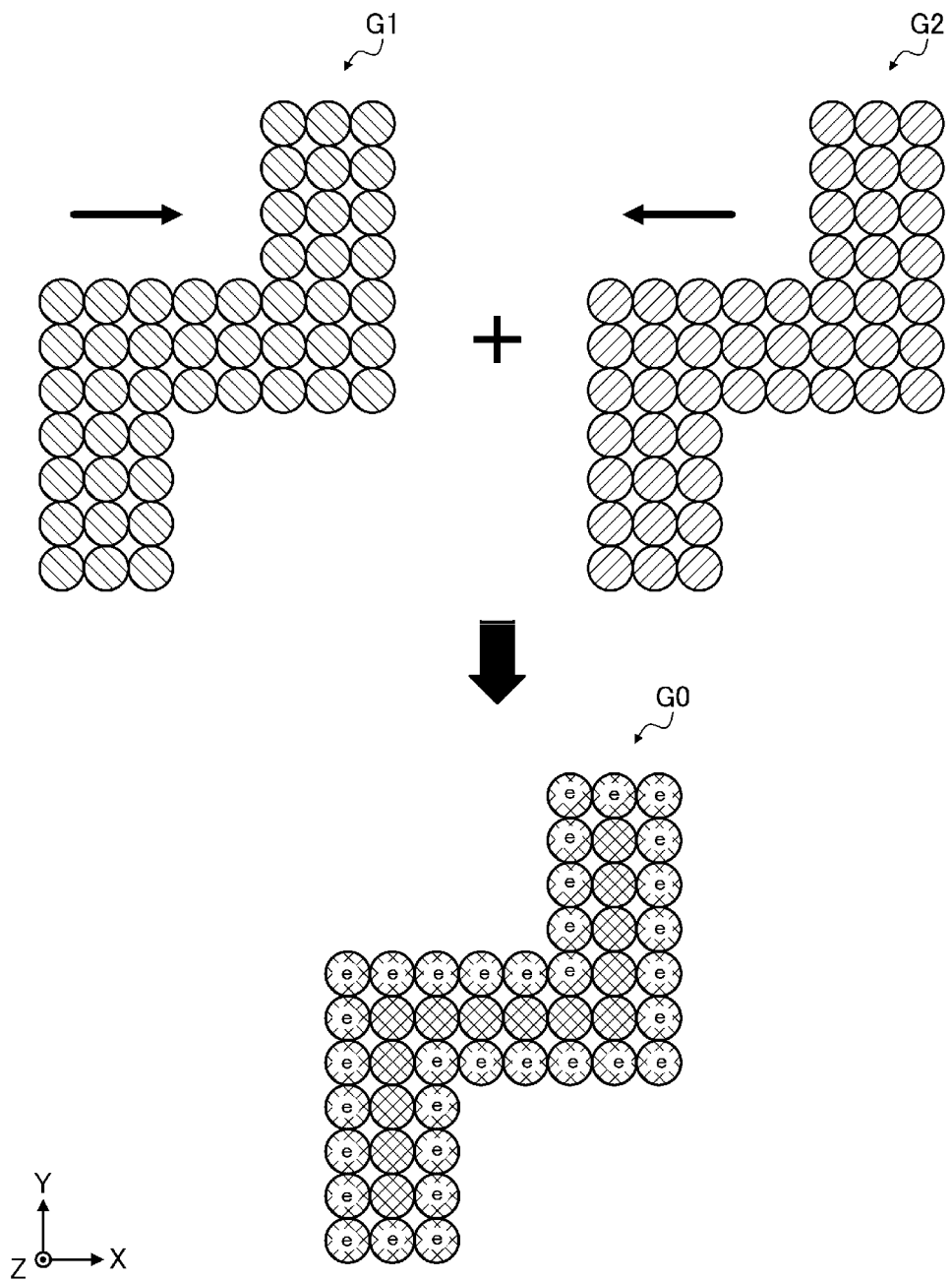
FIG. 5 is a conceptual diagram illustrating printing on a forward path and a return path, in a scanning direction, by two pass operations.
Figure 6:
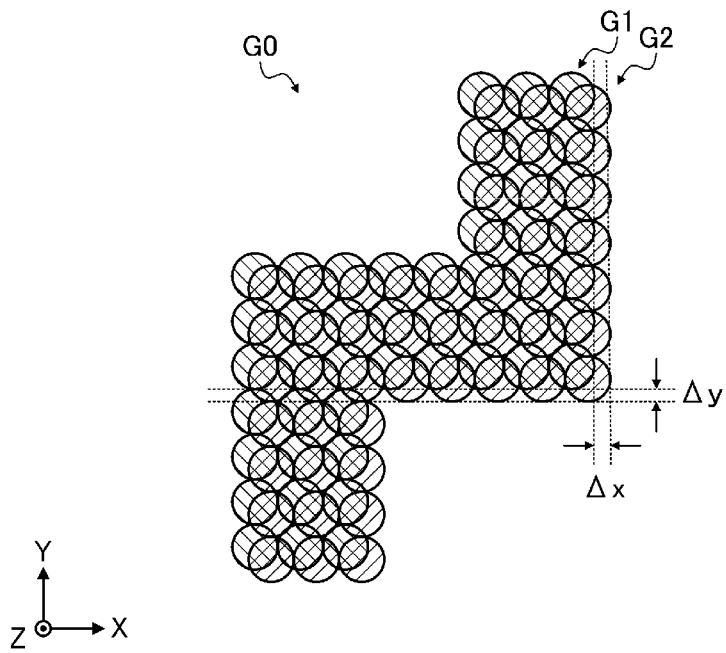
FIG. 6 is a conceptual diagram illustrating the print image when positional displacement occurs in the two pass operations.

Note that in FIG. 5 and FIG. 6, for ease of understanding, each of the pixels is shown as a round mark, but in the actual printing, as described above, the printing is performed as a collection of dots distributed in correspondence with each of the pixels.

In order to suppress the positional displacement of the printing between the pass operations from being visible as the banding unevenness, in the printing system 1 according to the embodiment, when forming each of the raster lines configuring the line image, by a plurality of the pass operations, when printing of a region corresponding to edge pixels of the line image by a first pass operation, which is one of the plurality of pass operations, is first printing, and printing of the region corresponding to the edge pixels by a second pass operation that is different from the first pass operation, of the plurality of pass operations, is second printing, the image processing device 110 generates, from the input image data of the print image including the line image, the print data to cause the brightness of the printing by the second printing to be higher than the brightness of the printing by the first printing.

Note that the edge pixels of the line image are pixels located at the outermost periphery of the pixels configuring the line image, such as the pixels denoted by e in the print image G0 in FIG. 5.

Further, as a printing method, in the formation of each of the raster lines, when the printing of the region corresponding to the edge pixels of the line image by the first pass operation, which is one of the plurality of pass operations, is the first printing, and the printing of the region corresponding to the edge pixels by the second pass operation that is different from the first pass operation, of the plurality of pass operations, is the second printing, the brightness of the printing by the second printing is higher than the brightness of the printing by the first printing. In the following description, several examples will be specifically described exemplifying the printing when each of the raster lines is completed by two of the pass operations, on the forward path and the return path.

1-1. FIRST EXAMPLE

A first example is described with reference to a flowchart illustrated in FIG. 7.

Figure 7:
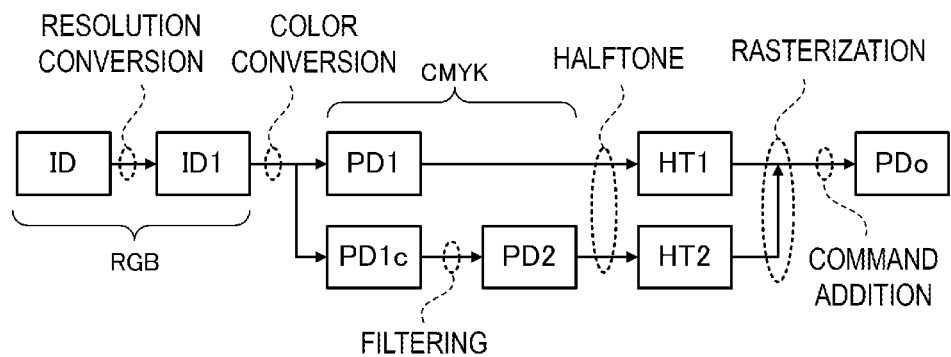
FIG. 7 is a flowchart illustrating a flow of print data generation processing according to a first example.

The flow illustrated in FIG. 7 is a flow in which the image processing device 110 that is the image processing unit generates the print data.

First, input image data ID output from the image processing application is converted to a resolution to be used when performing the printing on the printing medium 5, and input image data ID1 is generated.

Next, the input image data ID1 is color converted to generate print image data PD1 of the CMYK color system space represented by the ink amount data of the CMYK color system inks. Further, at the same time, print image data PD1c obtained by copying the print image data PD1 is generated as base image data on which the second printing is based. This step corresponds to a color conversion processing step of the embodiment.

Next, print image data PD2 is generated by performing filtering, as a brightness correcting step, on the print image data PD1c. Here, the filtering refers to processing that smooths, using a smoothing filter, the print image data Pd1c that is the base image data on which the second printing is based, and/or processing that deletes edge pixel data included in the print image data Pd1c that is the base image data on which the second printing is based. As a result of this filtering, the brightness of the printing by the second printing can be increased. Specific examples of the filtering will be described below.

Next, the halftone processing is performed on each of the print image data PD1 and the print image data PD2 to generate halftone data HT1 and halftone data HT2.

Next, the rasterization processing is performed to reflect the halftone data HT1 and the halftone data HT2 in each of the pass operations.

In the rasterization processing, in one of the two pass operations on the forward path and the return path, the rasterization processing is performed on the basis of the halftone data HT1 and the halftone data HT1 is reflected, and in the other of the two pass operations on the forward path and the return path, the rasterization processing is performed on the basis of the halftone data HT2 and the halftone data HT2 is reflected.

Next, the command addition processing is performed on the rasterized data, and print data PDo is generated.

The printer 100 executes the printing based on the generated print data PDo.

Here, when the one of the two pass operations on the forward path and the return path forming each of the raster lines is the first pass operation, and the other of the two pass operations is the second pass operation, the printing, by the first pass operation, of the region corresponding to the edge pixels of the line image is the first printing, and the printing, by the second pass operation, of the region corresponding to the edge pixels is the second printing. In this case, the printing method according to the first example includes a raster line forming step of forming each of the raster lines configuring the line image using the two pass operations, and the brightness of the printing by the second printing based on the halftone data HT2 is higher than the brightness of the printing by the first printing based on the halftone data HT1.

Next, the above-described filtering will be described.

The filtering includes processing to smooth, using the smoothing filter, the base image data on which the second printing is based, processing to delete the edge pixels included in the base image data on which the second printing is based, and processing that performs both of these processing.

For example, a moving average filter or a Gaussian filter can be used as the smoothing filter.

The moving average filter is a filter that averages gradation values of peripheral pixels that include a target pixel, and use the average as the gradation value of those pixels.

Further, the Gaussian filter is a filter that performs averaging using a coefficient based on a Gaussian distribution such that a weighting when calculating the average value of the gradation values of the peripheral pixels including the target pixel becomes larger the closer to the target pixel and smaller the further from the target pixel, and uses the obtained average as the gradation value of those pixels.

Details will be described with reference to FIG. 8 to FIG. 12.

Figure 8:
FIG. 8 is a matrix diagram illustrating an example of gradation values of print image data arranged in a matrix.

FIG. 8 illustrates an example of the print image data PD1 on which the first printing is based when printing the print image G0 illustrated in FIG. 5. The print image G0 illustrated here is a print image including a line image formed using black ink, numerical values illustrated in FIG. 8 indicate an example of gradation values corresponding to an amount of the black ink, and all of the pixels are 255.

The print image data PD2 on which the second printing is based is obtained by performing the filtering on the print image data PD1, and in actuality, on the copied print image data PD1c.

Figures 9, 10:
FIG. 9 is a matrix diagram illustrating an example of print image data obtained by performing processing using a Gaussian filter on the print image data illustrated in FIG. 8.
FIG. 10 is a matrix diagram illustrating a weighting matrix in the Gaussian filter.

FIG. 9 illustrates print image data PD2a generated by performing the filtering using the Gaussian filter. As a simple example, the Gaussian filter is calculated using a 3×3 weighting illustrated in FIG. 10. In the print image data PD2a, gradation values at positions corresponding to the edge pixels are converted to a value from 143 to 207, and it can be seen that the amount of black ink to be discharged is reduced, that is, the brightness of the printing by the second printing of the region corresponding to the edge pixels is higher than the brightness of the printing by the first printing.

Figure 11:
FIG. 11 is a matrix diagram illustrating an example of print image data obtained by performing edge pixel data deletion processing on the print image data illustrated in FIG. 8.

FIG. 11 illustrates print image data PD2b generated by performing, as the filtering, processing that deletes the edge pixel data included in the print image data PD1c. The processing that deletes the edge pixel data is processing in which the gradation values of positions corresponding to the edge pixels are set to zero, and the amount of black ink to be discharged is zero. In other words, the brightness of the printing by the second printing of the region corresponding to the edge pixels is higher than the brightness of the printing by the first printing.

Figure 12:
FIG. 12 is a matrix diagram illustrating an example of print image data obtained by performing processing using the Gaussian filter on the print image data after the edge pixel data has been deleted.

FIG. 12 illustrates print image data PD2c generated by performing, as the filtering, processing that first deletes the edge pixel data included in the print image data PD1c and then performs smoothing using the Gaussian filter. In the print image data PD2c, gradation values at positions corresponding to the edge pixels are converted to a value from 15.9 to 112, and it can be seen that the amount of black ink to be discharged is reduced, that is, the brightness of the printing by the second printing of the region corresponding to the edge pixels is higher than the brightness of the printing by the first printing.

The filtering may be the processing that smooths, using the smoothing filter, the print image data Pd1c that is the base image data on which the second printing is based, and/or the processing that deletes the edge pixel data included in the print image data Pd1c that is the base image data on which the second printing is based. Therefore, although the second printing may be performed based on any one of the print image data PD2a, the print image data PD2b, and the print image data PD2c, a filtering specification is preferably determined in accordance with a specification of the line image included in the print image, by evaluating the banding unevenness that is visible and a status of improving the banding unevenness.

For example, when the filtering is performed using the Gaussian filter, it is preferable to perform an evaluation such as changing the value of a in the Gaussian distribution function, that is, changing the size of the weighting matrix, and the like, and, when the edge pixels are to be deleted, it is preferable to perform an evaluation such as changing a width and location of the region of the edge pixels to be deleted. By changing the filtering specification in this way, the degree to which the brightness of the printing by the second printing of the region corresponding to the edge pixels is caused to be higher than the brightness of the printing by the first printing can be changed. In the functions of the printer driver, the printing system 1 can accept an input, from the input unit 112, of parameters to change the filtering specification, and can perform the filtering in accordance with the input parameters.

In other words, the printing system 1 includes the input unit 112 that specifies the degree to which the brightness of the printing according to the second printing is caused to be higher than the brightness of the printing by the first printing, and the image processing device 110 generates the print data in which the brightness of the printing by the second printing is higher, by smoothing, using the smoothing filter, the base image data on which the second printing is based.

Further, the degree of visible banding unevenness and the effects of the filtering may vary depending on the color tone of the line image or the print image including the line image. For example, in the case of an achromatic line image having a low degree of brightness, such as black or gray, even if there is a slight displacement between the first printing and the second printing, a difference in the thickness of the line image is easily visible. Further, a change in the brightness of a chromatic color may result in a change in the color tone of the line image to be printed.

Therefore, as the filtering specification, the effects thereof can be made more effective by causing the degree of brightness of the printing by the second printing corresponding to the edge pixels of the achromatic line image to be higher than the degree of brightness by which the printing by the second printing corresponding to the edge pixels of the chromatic color is made higher.

In other words, the brightness of the printing by the second printing corresponding to the edge pixels of the achromatic line image is preferably brighter than the brightness of the printing by the second printing corresponding to the edge pixels of the chromatic line image. In the printing system 1, a corresponding degree of filtering is set in accordance with a hue of the line image. Specifically, the image processing device 110 recognizes the hue of the line image included in the input image data ID, and performs the filtering that reflects a filtering specification set for the hue. As a result, the brightness of the printing by the second printing corresponding to the edge pixels of the achromatic line image is controlled to be brighter than the brightness of the printing by the second printing corresponding to the edge pixels of the chromatic line image.

Note that the filtering specification set for the hue is preferably prepared as a correlation function of the hue and the filtering specification or as a correspondence table, on the basis of sufficient evaluation performed in advance.

Further, when evaluating and determining the filtering specification, or when wishing to change the filtering specification, the hue that is to be the object of the filtering is preferably specified. Here, in the printer driver functions, the printing system 1 is capable of specifying, from the input unit 112, a hue for which the brightness of the printing by the second printing is higher than the brightness of the printing by the first printing. Information to be input about the hue is information specifying, for example, a hue angle using a range in an L*a*b* color space. For the input hue, the image processing device 110 generates the print data in which the brightness of the printing by the second printing increases.

In the rasterization processing, in the one of the two pass operations on the forward path and the return path, the rasterization processing is performed based on the halftone data HT1 that is obtained from the print image data PD1 to reflect the halftone data HT1, and in the other of the two pass operations on the forward path and the return path, the rasterization processing is performed based on the halftone data HT2 obtained from the print image data PD2 to reflect the halftone data HT2. As a result, the region corresponding to the edge pixels of the line image is printed by the first printing and by the second printing having the higher brightness than that of the printing by the first printing. In such a case, the color tone of the printing may vary depending on the order in which the first printing and the second printing are performed. This is assumed to be because a difference occurs in a degree to which a color material included in the ink soaks into the printing medium 5, depending on whether the first printing in which the ink amount is greater is performed first or is performed subsequently.

Figure 13:
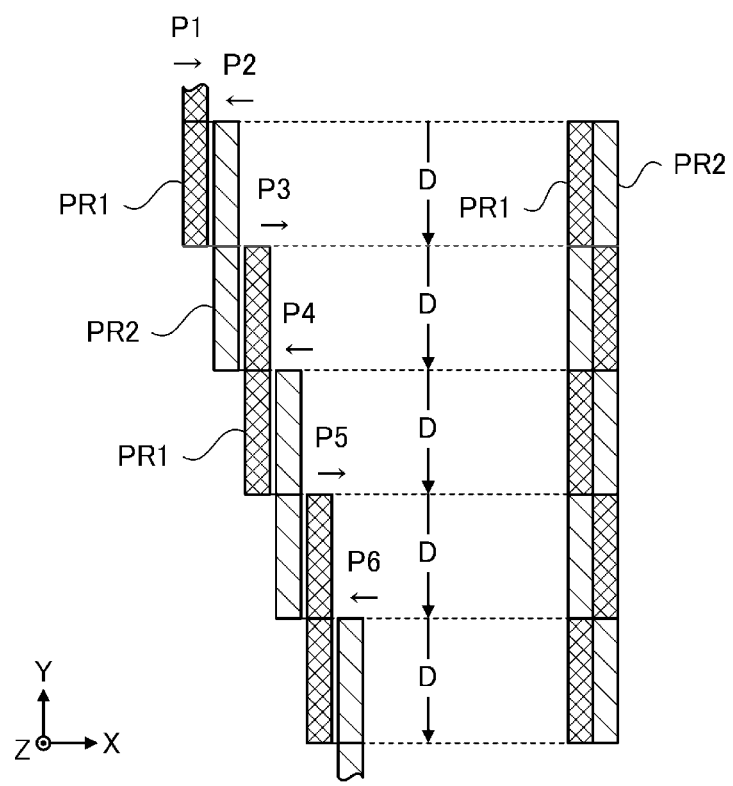
FIG. 13 is a conceptual diagram illustrating an example when an order of first printing and second printing is switched in an alternating manner when the printing is performed using the two pass operations.

On the left side in FIG. 13, for pass operations from nozzle rows P1 to P6 for which the printing is performed in the two pass operations, relative positions of the nozzle rows resulting from a step movement, each time, by a transport amount D of the printing medium 5 by the transport unit 50 are illustrated in a diagonal direction such that the nozzle rows do not overlap. In other words, although in FIG. 13, the nozzle rows are illustrated as though they are moving in the negative Y direction, in actuality, the printing medium 5 moves in the positive Y direction. Further, the positional relationship of the nozzle rows in the X-axis direction does not mean anything here.

For example, in this type of printing, as illustrated on the right side of FIG. 13, when the order in which first printing PR1 and second printing PR2 are performed changes before and after the printing medium 5 is transported with respect to the head 13, the difference in the color tone becomes visible as the banding unevenness.

Thus, in the printing system 1, in the rasterization processing including the path allocation, the order in which the first printing and the second printing are performed is stopped from being switched, and the banding is thus suppressed.

Figure 14:
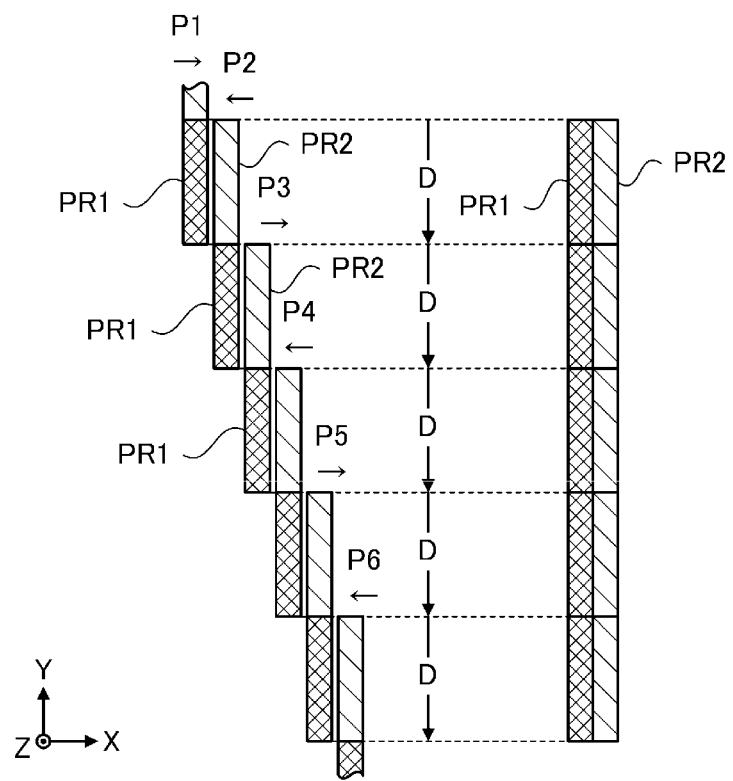
FIG. 14 is a conceptual diagram illustrating an example when the order of the first printing and the second printing does not change when the printing is performed using the two pass operations.

FIG. 14 illustrates an example when half of each of the nozzle rows is allocated to the first printing PR1 and the remaining half is allocated to the second printing PR2 such that the first printing PR1 is always performed first. By performing the allocation in this manner, it is possible to ensure that the order in which the first printing and the second printing are performed before and after the printing medium 5 is transported is not switched.

Incidentally, as a method for suppressing the banding from becoming visible as a result of the order in which the first printing PR1 and the second printing PR2 are performed being switched at each of the widths of the band, the width of the band at which the switching occurs may be made smaller. For example, as illustrated in FIG. 15, when the width of the band is defined as the width of a pixel unit, and the plurality of pixels configuring the line image are pixel columns aligned in the scanning direction, that is, in the X-axis direction in FIG. 15, the order in which the first printing PR1 and the second printing PR2 are performed may be alternately switched in the adjacent pixel columns.

Further, rasterization may be performed such that the order in which the first printing PR1 and the second printing PR2 are performed is alternately switched in the adjacent raster lines.

Figure 15:
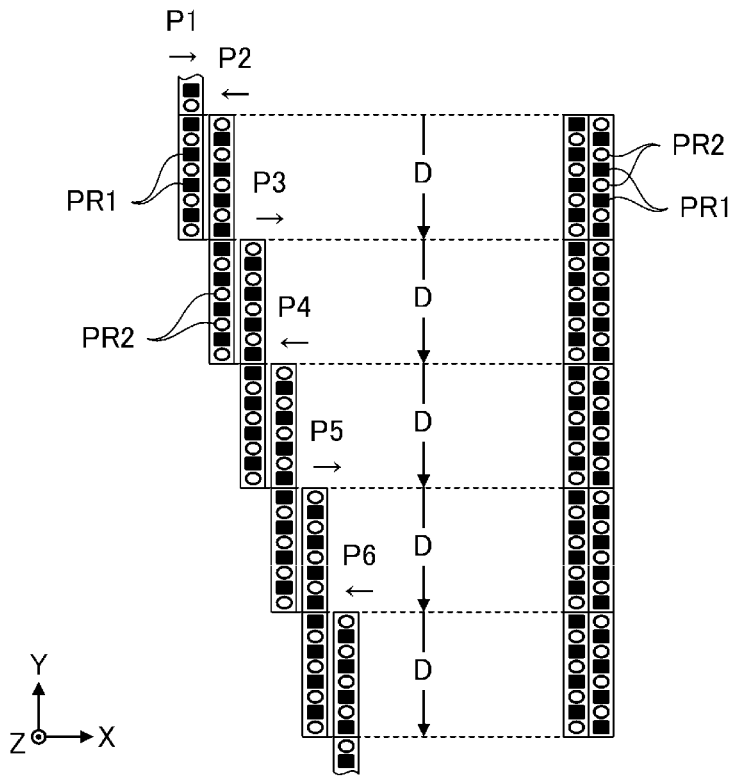
FIG. 15 is a conceptual diagram illustrating an example when a width of a band when the order of the first printing and the second printing is switched in the alternating manner is reduced when the printing is performed using the two pass operations.

A unit represented by a black square illustrated in FIG. 15 is a nozzle row corresponding to a pixel at which the first printing PR1 is performed or the nozzle that performs the first printing PR1, and a unit represented by a white circle is a nozzle corresponding to a pixel for which the second printing PR2 is performed or the nozzle that performs the second printing PR2.

1-2. SECOND EXAMPLE

Figure 16:
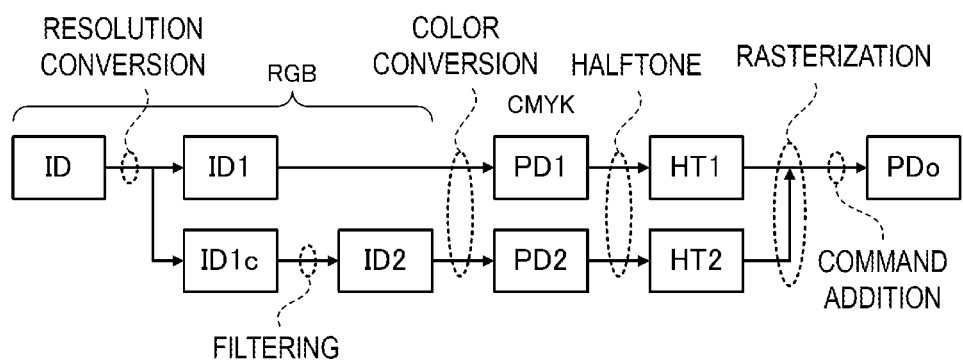
FIG. 16 is a flowchart illustrating a flow of the print data generation processing according to a second example.

A second example will be described with reference to a flowchart illustrated in FIG. 16.

In the first example, the filtering is performed on the print image data of the CMYK color system space as the base image data on which the second printing is based. In the second example, filtering is performed on the input image data of the RGB color system space as the base image data on which the second printing is based.

First, as in the first example, the input image data ID output from the image processing application is converted to the resolution to be used for performing the printing on the printing medium 5, and the input image data ID1 is generated. Further, at the same time, the input image data ID1c obtained by copying the input image data ID1 is generated, as the base image data on which the second printing is based.

Next, input image data ID2 is generated by performing filtering on the input image data ID1c, as the brightness correcting step. Apart from the fact that the data on which the filtering is performed is different, the filtering is the same as in the first example.

Next, the input image data ID1 is color converted to generate the print image data PD1 of the CMYK color system space. Further, the input image data ID2 is color converted to generate the print image data PD2 of the CMYK color system space.

The following processing is the same as that of the first example.

As described above, the base image data on which the filtering is performed may be the input image data of the RGB color system space.

1-3. THIRD EXAMPLE

Figure 17:
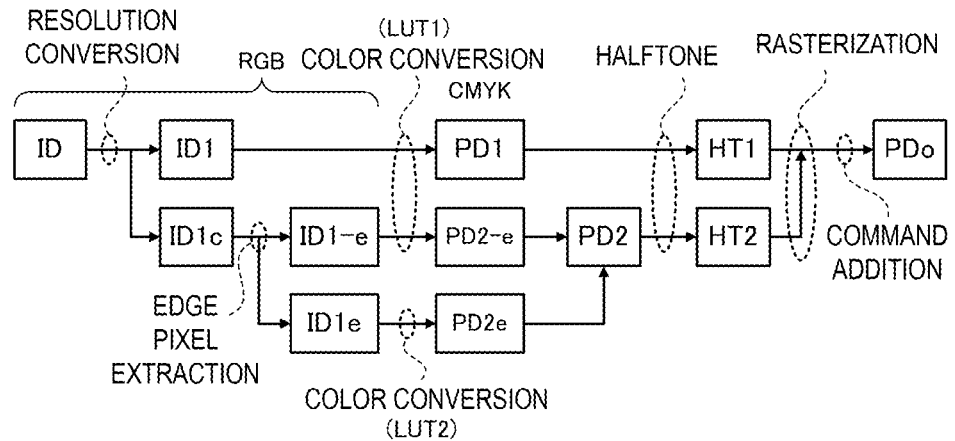
FIG. 17 is a flowchart illustrating a flow of the print data generation processing according to a third example.

A third example will be described with reference to a flowchart illustrated in FIG. 17.

In the examples described above, the filtering is described as including processing performed by deleting the edge pixel data included in the base image data on which the second printing is based, but, rather than deleting the edge pixel data included in the base image data on which the second printing is based, a method may be used to perform conversion using a different color conversion lookup table, such that the printing can be performed where only the edge pixels in the second printing are brighter.

First, as in the second example, the input image data ID output from the image processing application is converted to the resolution to be used for performing the printing on the printing medium 5, and the input image data ID1 is generated. Further, at the same time, the input image data ID1c obtained by copying the input image data ID1 is generated, as the base image data on which the second printing is based.

Next, the edge pixels of the line image are extracted from the input image data ID1c, and edge image data ID1e formed by the edge pixels and internal image data ID1-e not including the edge pixels are generated. Extracting the edge pixels of the line image from the input image data ID1c to generate the edge image data ID1e including the edge pixels corresponds to an edge pixel extracting step in the embodiment.

Next, the input image data ID1 and the internal image data ID1-e are color converted using a color conversion lookup table LUT1 to generate the print image data PD1 and print image data PD2-e of the CMYK color system space. This step corresponds to a first color conversion processing step in the embodiment, and the print image data generated in this step corresponds to first print image data. Further, the edge image data ID1e is color converted using a color conversion lookup table LUT2 to generate print image data PD2e of the CMYK color system space. This step corresponds to a second color conversion processing step in the embodiment, and the print image data generated in this step corresponds to second print image data.

Here, the color conversion lookup table LUT1 is a color conversion lookup table used in normal printing. The color conversion lookup table LUT2 is a color conversion table that performs the conversion such that the brightness of the second printing of the region corresponding to the edge pixels of the line image is higher than the brightness of the printing by the first printing, and the color conversion lookup table LUT2 is prepared in advance on the basis of sufficient evaluation.

Next, the print image data PD2-e and the print image data PD2e are merged to generate the print image data PD2.

The following processing is the same as that of the first example.

In other words, as the printing method, the printing method includes the first color conversion processing step of converting the input image data input to the printing device for printing the print image including the line image into the first print image data of the CMYK color space represented by the ink amount data of the CMYK color system inks, the edge pixel extracting step of extracting the edge pixels of the line image, from the input image data, to generate the edge pixel data formed by the edge pixels, and the second color conversion processing step of converting the edge pixel data into second print image data of the CMYK color space. The first printing is performed based on the first print image data and the second printing is performed based on the second print image data.

In this way, the method may be a method in which only the edge pixels in the second printing are converted to be brighter using the different color conversion lookup table.

According to the embodiment, the following advantages can be obtained.

The printing method according to the embodiment is a printing method that performs the printing of the print image including the line image while forming each of the raster lines that configure the line image using the plurality of pass operations. Of the plurality of pass operations, when the printing of the region corresponding to the edge pixels of the line image by the first pass operation is the first printing, and the printing of the region corresponding to the edge pixels by the second pass operation is the second printing, the printing is performed in which the brightness of the printing by the second printing is higher than the brightness of the printing by the first printing. In other words, the region corresponding to the edge pixels of the line image is printed by the first printing, by the first pass operation, and by the second printing, by the second pass operation, in which the brightness of the printing is higher than the brightness of the printing by the first printing. In the printing of the region corresponding to the edge pixels of the line image, even when displacement occurs between the position of the first printing and the position of the second printing, since the brightness of the printing by the second printing is higher, the displacement becomes less visible, and in the printing using the plurality of pass operations, the visibility thereof as the banding unevenness is suppressed.

Further, as a technique for increasing the brightness of the printing by the second printing, by smoothing, using the smoothing filter, the base image data on which the second printing is based, and/or by deleting the edge pixel data included in the base image data on which the second printing is based, the brightness of the printing by the second printing of the region corresponding to the edge pixels of the line image can be easily increased. In other words, printing can be performed in which the visibility of the banding is easily suppressed. In the second printing, when the edge pixels are deleted, an amount of protrusion due to the displacement is reduced, and thus, the line image is suppressed from becoming thick, and the visibility of the banding is suppressed.

Further, the printer 100 that performs the printing using the printing method according to the embodiment is a printing device the printing device is a printing device configured to perform printing using CMYK color system inks as the liquid. The printing method includes the color conversion processing step of converting the input image data input to the printing device for printing the print image including the line image into the print image data of the CMYK color space represented by the ink amount data of the CMYK color system inks, and a brightness correcting step of increasing the brightness of the printing by the second printing by smoothing, using the smoothing filter, the print image data on which the second printing is based, of the converted print image data.

The print image data of the CMYK color space is the ink amount data for the CMYK color system inks, and even when smoothed using the smoothing filter, only the value of the ink amount is smoothed. Thus, the change in the color tone is small, compared to a case, for example, in which the color conversion processing is performed after smoothing the image data of the RGB color space, and the ink amount data of different inks are generated. In other words, more appropriate printing can be performed while suppressing the banding.

Further, by using the Gaussian filter as the smoothing filter, it is possible to easily obtain an effective banding suppression effect.

Further, the printer 100 for performing the printing using the printing method according to the embodiment is the printing device the printing device is a printing device configured to perform the printing using the CMYK color system inks as the liquid. The printing method includes the first color conversion processing step of converting the input image data input to the printing device for printing the print image including the line image into the first print image data of the CMYK color space represented by the ink amount data of the CMYK color system inks, the edge pixel extracting step of extracting the edge pixels of the line image, from the input image data, to generate the edge pixel data formed by the edge pixels, and the second color conversion processing step of converting the edge pixel data into the second print image data of the CMYK color space. The first printing is performed based on the first print image data and the second printing is performed based on the second print image data.

By the second color conversion processing, the second print image data of the CMYK color space on which the second printing is based is generated independently from the first print image data of the CMYK color space on which the first printing is based. Therefore, a color conversion specification in the second color conversion processing process can be freely set. In other words, the degree to which the brightness of the printing by the second printing is increased can be easily adjusted.

Further, according to the printing method according to the embodiment, the brightness of the printing by the second printing of the region corresponding to the edge pixels of the line image that is achromatic is brighter than the brightness of the printing by the second printing of the region corresponding to the edge pixels of the line image that is chromatic. When causing the displacement of the second printing with respect to the first printing to be less visible by causing the brightness of the printing by the second printing to be brighter, there is a case in which a change in the brightness of the chromatic color causes a change in the color tone of the line image to be printed. Further, when the edge pixels are the achromatic color having a low brightness, even with a slight displacement of the second printing with respect to the first printing, the difference in the thickness of the line image is easily visible. Therefore, by causing the degree of brightness of the printing by the second printing of the region corresponding to the edge pixels of the line image that is achromatic to be higher than the degree of brightness of the printing by the second printing of the region corresponding to the edge pixels of the line image that is chromatic, those effects can be made more effective.

Further, when the rasterization processing is performed such that the order of the first printing and the second printing are performed is not switched, the changing of the color tone of the region to be printed as a result of the order of the first printing and the second printing being switched is eliminated.

Further, when a row of a plurality of pixels configuring the line image aligned in the scanning direction is the pixel row, when the rasterization processing is performed such that an order in which the first printing and the second printing are performed is switched between the adjacent pixel rows, even when the color tone of the region to be printed changes as a result of the order in which the first printing and the second printing are performed being switched, since the order of the first printing and the second printing is switched alternately for each of the pixel rows, the color tone that has changed is not easily visible.

Further, when the rasterization processing is performed such that the order in which the first printing and the second printing are performed is switched between the adjacent raster lines, even when the color tone of the region to be printed changes as a result of the order in which the first printing and the second printing are performed being switched, since the order of the first printing and the second printing is switched alternately for each of the raster lines, the color tone that has changed is not easily visible.

Further, the printing system 1 performs the printing such that, when the printing of the region corresponding to the edge pixels of the line image by the first pass operation, which is one of the plurality of pass operations, is first printing, and printing of the region corresponding to the edge pixels by the second pass operation that is different from the first pass operation, of the plurality of pass operations, is second printing, the brightness of the printing by the second printing is higher than the brightness of the printing by the first printing. In other words, the region corresponding to the edge pixels of the line image is printed by the first printing, by the first pass operation, and by the second printing, by the second pass operation, in which the brightness of the printing is higher than the brightness of the printing by the first printing. In the printing of the region corresponding to the edge pixels of the line image, even when displacement occurs between the position of the first printing and the position of the second printing, since the brightness of the printing by the second printing is higher, the displacement becomes less visible, and in the printing using the plurality of pass operations, the visibility thereof as the banding unevenness is suppressed.

Further, since the printing system 1 includes the input unit 112 configured to specify a degree to which the brightness of the printing by the second printing is higher than the brightness of the printing by the first printing, adjustment is possible so as to perform more appropriate printing depending on the status of the printing of the print image.

Further, since the printing system 1 includes the input unit 112 configured to specify a hue for which the brightness of the printing by the second printing becomes higher than the brightness of the printing by the first printing, adjustment is possible so as to perform more appropriate printing depending on the status of the printing of the print image.

2. Second Embodiment

In the first embodiment, the printing method and the printing system are described. Here, an embodiment of a printing device is described.

Although the printing system 1 is described as being configured by the printer 100 and the image processing device 110 coupled to the printer 100, the printing system 1 may be configured by a single printing device in which the functions provided in the image processing device 110 are allocated to the printer control unit 30 provided in the printer 100.

Figure 18:
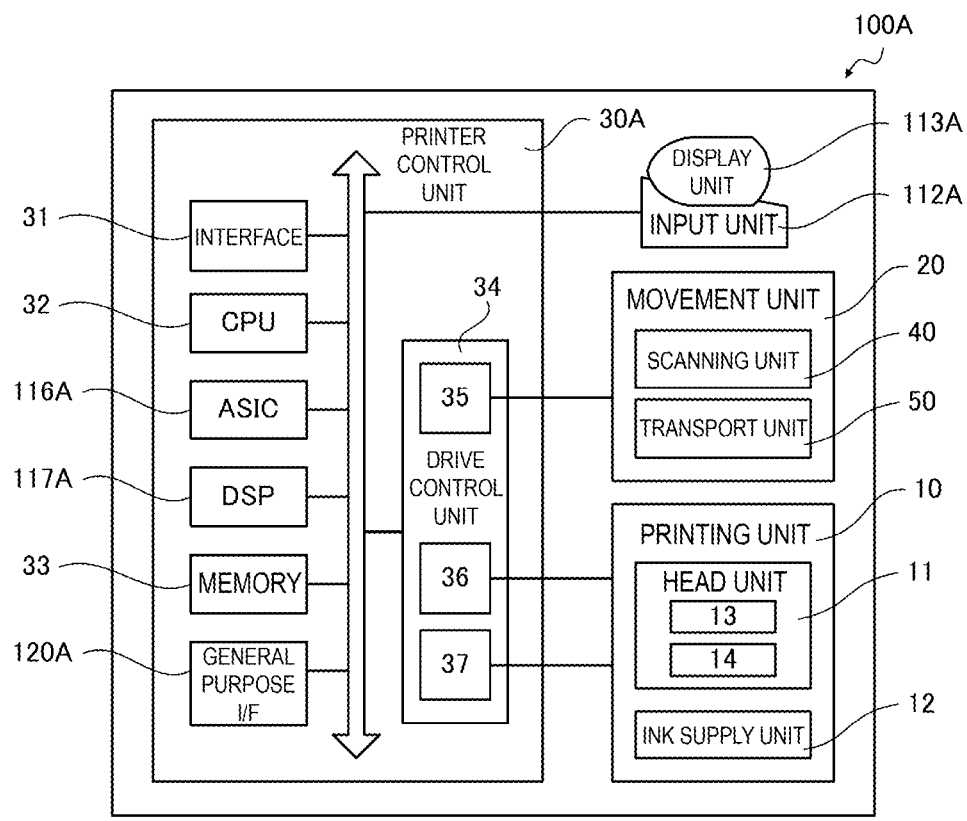
FIG. 18 is a block diagram illustrating a configuration of a printing device according to a second embodiment.

FIG. 18 is a block diagram illustrating a configuration of a printer 100A as the printing device according to the embodiment.

Since the printer 100A includes the functions of the image processing device 110, the image processing device 110 is not necessary in this configuration. The printer 100A is an inkjet printer that performs image processing using a printer control unit 30A provided in the printer 100A, on the basis of input image data received from an external electronic apparatus, and prints a desired image on the printing medium 5.

The printer 100A includes the printing unit 10, the movement unit 20, the printer control unit 30A, an input unit 12A, a display unit 113A, and the like. The printer 100A that has received the input image data uses the printer control unit 30A to generate print data, and uses the printer control unit 30A to control the printing unit 10 and the movement unit 20 to print an image on the printing medium 5.

The printer control unit 30A includes the interface 31, the CPU 32, the memory 33, the drive control unit 34, an ASIC 116A, a DSP 117A, a general purpose interface 120A, and the like, and, in addition to the image processing of the input image data received by the interface 31, performs centralized control of the printer 100A. Processing performed by the printer driver in the first embodiment is performed by the ASIC 116A and the DSP 117A under the control of the CPU 32.

The input unit 112 is an information input device serving as a human interface. The display unit 113A is an information display device as a human interface, and, under the control of the printer control unit 30A, displays information input from the input unit 112A, images to be printed by the printer 100A, information related to print jobs, and the like. A touch panel is assumed to be a preferred example of the input unit 112A and the display unit 113A.

In other words, the printer 100A that is the printing device includes the transport unit 50 that transports the printing medium 5 in the transport direction, the head 13 that discharges the liquid onto the transported printing medium 5, the scanning unit 40 that moves the head 13 relative to the printing medium 5, in the scanning direction intersecting the transport direction, and the printer control unit 30A that controls the transport unit 50, the head 13, and the scanning unit 40 to perform the printing by repeating the pass operation of discharging the liquid while moving the head 13 and the transport operation by the transport unit 50.

Further, in the printing of the print image including the line image, when forming each of the raster lines configuring the line image using the plurality of pass operations, when, in the formation of each of the raster lines, the printing of the region corresponding to the edge pixels by the first pass operation, which is one of the plurality of pass operations, is the first printing, and the printing of the region corresponding to the edge pixels by the second pass operation different from the first pass operation, of the plurality of pass operations, is the second printing, the printer control unit 30A performs control such that the brightness of the printing by the second printing is higher than the brightness of the printing by the first printing.

The input unit 112A provided in the printer 100A includes the functions of the input unit 112 in the printing system 1, under the control of the printer control unit 30A. In other words, the printer 100A includes the input unit 112A that specifies the degree to which the brightness of the printing by the second printing is higher than the brightness of the printing by the first printing. Further, the printer 100A includes the input unit 112A that specifies the hue for which the brightness of the printing by the second printing is higher than the brightness of the printing by the first printing. In this way, the printing system 1 may be configured by the printer 100A as the printing device.

According to the embodiment, the following advantages can be obtained.

The printer 100A that is the printing device according to the embodiment performs the printing such that, when the printing of the region corresponding to the edge pixels by the first pass operation, which is one of the plurality of pass operations, is the first printing, and the printing of the region corresponding to the edge pixels by the second pass operation different from the first pass operation, of the plurality of pass operations, is the second printing, the brightness of the printing by the second printing is higher than the brightness of the printing by the first printing. In other words, the region corresponding to the edge pixels of the line image is printed by the first printing, by the first pass operation, and by the second printing, by the second pass operation, in which the brightness of the printing is higher than the brightness of the printing by the first printing. In the printing of the region corresponding to the edge pixels of the line image, even when displacement occurs between the position of the first printing and the position of the second printing, since the brightness of the printing by the second printing is higher, the displacement becomes less visible, and in the printing using the plurality of pass operations, the visibility thereof as the banding unevenness is suppressed.

Further, since the printer 100A includes the input unit 112A for specifying the degree to which the brightness of the printing by the second printing is higher than the brightness of the printing by the first printing, the adjustment is possible so as to perform more appropriate printing depending on the status of the printing of the print image.

Further, since the printer 100A includes the input unit 112A for specifying the hue for which the brightness of the printing by the second printing is higher than the brightness of the printing by the first printing, the adjustment is possible so as to perform more appropriate printing depending on the status of the printing of the print image.

Note that the printer 100 that is the printing device in the configuration of the printing system 1 described in the first embodiment receives the print data from the image processing device 110, and, in the printing of the print image including the line image, by the plurality of pass operations, when, in the formation of each of the raster lines, the printing of the region corresponding to the edge pixels of the line image by the first pass operation, which is one of the plurality of pass operations, is the first printing, and the printing of the region corresponding to the edge pixels by the second pass operation that is different from the first pass operation, of the plurality of pass operations, is the second printing, the printer control unit 30 performs control to cause the brightness of the printing by the second printing to be higher than the brightness of the printing by the first printing. Therefore, similarly to the printer 100A, it can be said that the printer 100 is the printing device of the present application.

What is claimed is:

1. A printing method for performing printing by a printing device including a transport unit configured to transport a printing medium in a transport direction, a head configured to discharge a liquid onto the transported printing medium, a scanning unit configured to move the head relative to the printing medium in a scanning direction intersecting the transport direction, and a control unit configured to control the transport unit, the head, and the scanning unit to perform the printing by repeating a pass operation of causing the head to perform scanning motion while discharging the liquid, and a transport operation by the transport unit, the method comprising:

in printing of a print image including a line image, a raster line forming step, executed by a processor, of forming each of raster lines configuring the image, by a plurality of the pass operations, wherein in the formation of each of the raster lines, when printing of a region corresponding to edge pixels of the line image by a first pass operation, which is one of the plurality of pass operations, is first printing, and printing of the region corresponding to the edge pixels by a second pass operation that is different from the first pass operation, of the plurality of pass operations, is second printing, an amount of the liquid to be discharged in each of the edge pixels during the second printing is less than an amount of the liquid to be discharged in a corresponding one of the edge pixels during the first printing by using, in the second printing, print image data generated by reducing a gradation value of each of the edge pixels in base image data for the first printing, and the method further comprises a brightness correcting step, executed by the processor, of increasing a brightness of the printing by the second printing by at least one of
smoothing, using a smoothing filter, the base image data, and
deleting data of the edge pixels included in the base image data.

2. The printing method according to claim 1, wherein the printing device is a printing device configured to perform printing using CMYK color system inks as the liquid, and
the printing method includes
a color conversion processing step of converting input image data input to the printing device for printing the print image including the line image into print image data of a CMYK color space represented by ink amount data of the CMYK color system inks, and
the brightness correcting step includes smoothing, using the smoothing filter, the print image data on which the second printing is based, of the converted print image data.

3. The printing method according to claim 1, wherein the smoothing filter is a Gaussian filter.

4. The printing method according to claim 1, wherein the printing device is a printing device configured to perform printing using CMYK color system inks as the liquid, and
the printing method includes
a first color conversion processing step of converting input image data input to the printing device for printing the print image including the line image into first print image data of a CMYK color space represented by ink amount data of the CMYK color system inks,
an edge pixel extracting step of extracting the edge pixels of the line image, from the input image data, to generate edge pixel data formed by the edge pixels, and
a second color conversion processing step of converting the edge pixel data into second print image data of the CMYK color space, and
the first printing is performed based on the first print image data and the second printing is performed based on the second print image data.

5. The printing method according to claim 1, wherein the brightness of the printing by the second printing of the region corresponding to the edge pixels of the line image that is achromatic is brighter than the brightness of the printing by the second printing of the region corresponding to the edge pixels of the line image that is chromatic.

6. The printing method according to claim 1, wherein an order of the first printing and the second printing is not switched.

7. The printing method according to claim 1, wherein when a row of a plurality of pixels configuring the line image aligned in the scanning direction is a pixel row, an order of the first printing and the second printing is alternately switched between the adjacent pixel rows.

8. The printing method according to claim 1, wherein an order of the first printing and the second printing is alternately switched between the adjacent raster lines.

9. A printing device comprising:
a transport unit configured to transport a printing medium in a transport direction;
a head configured to discharge a liquid onto the transported printing medium;
a scanning unit configured to move the head relative to the printing medium in a scanning direction intersecting the transport direction; and
a control unit configured to control the transport unit, the head, and the scanning unit to perform the printing by repeating a pass operation of causing the head to perform scanning motion while discharging the liquid, and a transport operation by the transport unit, wherein
in printing of a print image including a line image, the control unit
performs control to form each of raster lines configuring the line image, by a plurality of the pass operations, and
when, in the formation of each of the raster lines, printing of a region corresponding to edge pixels of the line image by a first pass operation, which is one of the plurality of pass operations, is first printing, and printing of the region corresponding to the edge pixels by a second pass operation that is different from the first pass operation, of the plurality of pass operations, is second printing, performs control to set an amount of the liquid to be discharged in each of the edge pixels during the second printing to be less than an amount of the liquid to be discharged in a corresponding one of the edge pixels during the first printing by using, in the second printing, print image data generated by reducing a gradation value of each of the edge pixels in base image data for the first printing, and
the control unit further performs control to increase a brightness of the printing by the second printing by at least one of
smoothing, using a smoothing filter, the base image data, and
deleting data of the edge pixels included in the base image data.

10. A printing system comprising:
an image processing unit configured to convert input input image data to print data;
a transport unit configured to transport a printing medium in a transport direction;
a head configured to discharge a liquid onto the transported printing medium;
a scanning unit configured to move the head relative to the printing medium in a scanning direction intersecting the transport direction; and
a control unit configured to control the transport unit, the head, and the scanning unit based on the print data, to perform the printing by repeating a pass operation of causing the head to perform scanning motion while discharging the liquid, and a transport operation by the transport unit, wherein
when forming each of raster lines configuring the line image, by a plurality of the pass operations, when printing of a region corresponding to edge pixels of the line image by a first pass operation, which is one of the plurality of pass operations, is first printing, and printing of the region corresponding to the edge pixels by a second pass operation that is different from the first pass operation, of the plurality of pass operations, is second printing, the image processing unit generates, from the input image data of a print image including a line image, the print data to cause an amount of the liquid to be discharged in each of the edge pixels during the second printing to be less than an amount of the liquid to be discharged in a corresponding one of the edge pixels during the first printing by using, in the second printing, print image data generated by reducing a gradation value of each of the edge pixels in base image data for the first printing, and the control unit is further configured to increase a brightness of the printing by the second printing by at least one of smoothing, using a smoothing filter, the base image data, and deleting data of the edge pixels included in the base image data.

* * * * *